(12) United States Patent
Chan

(10) Patent No.: US 7,226,223 B2
(45) Date of Patent: Jun. 5, 2007

(54) CAMERA WITH MOTORIZED FILM ADVANCEMENT

(75) Inventor: Yet Chan, Hong Kong (HK)

(73) Assignee: Foster Assets Group, Hong Kong (HK)

( * ) Notice: Subject to any disclaimer, the term of this patent is extended or adjusted under 35 U.S.C. 154(b) by 0 days.

(21) Appl. No.: 10/987,755

(22) Filed: Nov. 11, 2004

(65) Prior Publication Data

US 2005/0084257 A1 Apr. 21, 2005

Related U.S. Application Data

(63) Continuation-in-part of application No. 10/633,783, filed on Aug. 4, 2003, now abandoned.

(30) Foreign Application Priority Data

Feb. 28, 2003 (HK) ............................... 03101538.4

(51) Int. Cl.
*G03B 1/00* (2006.01)
(52) U.S. Cl. ...................... 396/418; 396/394; 396/403; 396/418
(58) Field of Classification Search ................ 396/403, 396/418
See application file for complete search history.

(56) References Cited

U.S. PATENT DOCUMENTS

| | | | |
|---|---|---|---|
| 3,646,867 A * | 3/1972 | Ono | ............................ 396/415 |
| 4,671,636 A | 6/1987 | Malloy Desormeaux | |
| 5,565,945 A | 10/1996 | Tobise et al. | |
| 5,617,164 A | 4/1997 | Siekierski et al. | |
| 5,669,019 A * | 9/1997 | Woltz et al. | ................... 396/25 |
| 5,875,366 A | 2/1999 | Yoshida et al. | |
| 5,881,320 A | 3/1999 | Balling | |
| 5,899,584 A | 5/1999 | Balling | |
| 5,905,916 A | 5/1999 | Kamata | |
| 5,946,511 A | 8/1999 | Balling et al. | |
| 6,447,176 B2 | 9/2002 | White et al. | |
| 6,587,645 B1 | 7/2003 | Chan | |
| 6,628,896 B2 | 9/2003 | Oshima | |
| 2003/0007791 A1 | 1/2003 | Chan | |

FOREIGN PATENT DOCUMENTS

GB 2 228 798 9/1990

OTHER PUBLICATIONS

RD 395056A, Derwent Abstract, Mar. 10, 1997.

* cited by examiner

*Primary Examiner*—D. Rutledge
(74) *Attorney, Agent, or Firm*—Brooks Kushman P.C.

(57) ABSTRACT

A camera (2) has a main body (4) defining a pair of film chambers on opposite sides of an exposure opening (18) comprising a first chamber (14) for receiving a film cassette having a central spool to which film is secured and a second chamber (16) for receiving a second film container into which film is pre-wound prior to use, a drive shaft having an end which extends into the first chamber (14) for engaging the spool, an electric motor (30) disposed between the chambers operably connected to the drive shaft to drive the shaft in one direction, and a shutter mechanism with a shutter release assembly operably connected to the motor control.

14 Claims, 12 Drawing Sheets

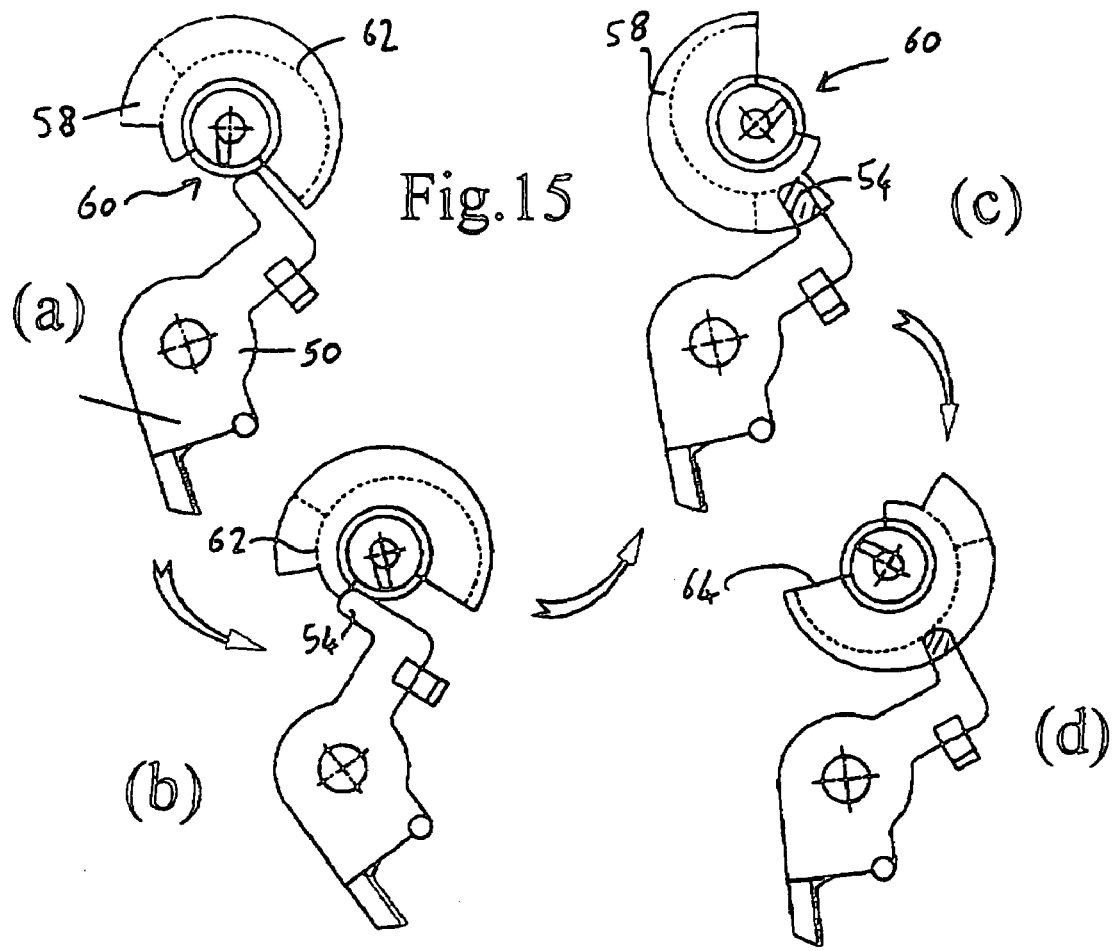

CAMERA WITH MOTORIZED FILM ADVANCEMENT

This application is a Continuation of Ser. No. 10/633,783 filed on Aug. 4, 2003 now abandoned.

BACKGROUND OF THE INVENTION

The present invention relates to a motorised camera and in particular to a camera of simple construction of the type generally sold to a customer pre-loaded with film and which is provided with motorised film advancement.

In the early 1990's cameras known variously as disposable or single-use cameras, or referred to by some as lens-fitted photographic film packages, became increasingly popular. These are cameras of simple construction and low cost which are usually pre-loaded with film by the manufacturer. It is usually arranged that the film is unwound from a standard film cassette or patrone on assembly of the camera, and as pictures are sequentially taken the film is wound back into the cassette. Once the user finishes the film, the user returns the entire camera to the photolab for developing of the film. The manufacturer may then either discard the camera in its entirety, or subject to appropriate checks that the camera is still functional, re-load the camera. Alternatively the manufacturer may re-use specific components of the camera. As the awareness of problems of environmental contamination increases, as well as for economic reasons, consumers are less willing to tolerate disposable products. Various cameras of this general type have been proposed including adaptations allowing them to be re-used at least several times by the user.

Of particular concern with such cameras is ease of re-loading of film. It has previously been proposed by the applicant to provide the film for such cameras in the form of a film assembly comprising a standard film cassette or cartridge and a second film take-up cassette into which the majority of film is pre-wound. The applicant's U.S. Ser. No. 09/495,223 describes a method of film winding of such a film assembly and loading of such a film assembly into such a camera.

One of the drawbacks of such cameras from the point of the user is the requirement to manually wind on the film after each exposure, which necessarily takes time and is awkward, particularly for those of limited manual dexterity. Motorised film advancement is well-known for more costly types of cameras such as compact cameras and single lens reflex types, but in such cameras arrangements of considerable complexity are generally provided being inappropriate for cameras of the simple type as mentioned.

The present invention seeks to provide a motorised camera which overcomes these drawbacks.

SUMMARY OF THE INVENTION

According to a first aspect of the present invention there is provided a camera comprising a main body defining a pair of film chambers on opposite sides of an exposure opening comprising a first chamber for receiving a film cassette having a central spool to which film is secured and a second chamber for receiving a second film container into which film is pre-wound prior to use, a drive shaft having an end which extends into the first chamber for engaging the spool, and an electric motor operably connected to the drive shaft to drive the drive shaft in one direction.

The camera may have a shutter mechanism including a movable shutter blade, and a shutter release assembly having a user-accessible shutter button, and further comprising switch means to control operation of the motor, the switch means being controlled by the shutter release assembly. The shutter release assembly has a primed position wherein depression of the shutter button activates the shutter blade, and a discharged position subsequent to depression of shutter button. The switch means and shutter release assembly are arranged to activate the motor on depression of the shutter button and subsequent release. The shutter release assembly is arranged to de-activate the motor on movement of the shutter release assembly from the discharged condition back to the primed position.

In the preferred embodiment the switch means comprises first and second metallic spring contacts disposed to be separated in the primed position, preferably of parallel overlapping form. The contacts are arranged to remain separated after discharge of the shutter until the shutter button is released, at which point they engage.

The shutter release assembly may comprise a movable shutter release lever arranged between the shutter button and the shutter blade, which holds the first and second spring contacts apart in the primed position. The second spring contact vertically overlies the first spring contact, wherein the shutter release lever is arranged to be depressible through the action of the shutter button against the action of resilient means such as a return spring, and to return to an upward position on return to the primed position, the shutter button also acting on the first spring contact to depress this on depression of the shutter button, and the second spring contact being downwardly biased and abutting the shutter release lever in the primed position, whereby electrical contact is made after depression and subsequent release of the shutter button.

An actuating lever may be disposed between the shutter button and the first spring contact and the shutter release lever whereby depression of the shutter button causes depression of the first spring contact, and of the shutter release lever. The shutter release lever is preferably mounted for rotation about a vertical axis one end of which is adapted to strike the shutter blade, and the other end of which is acted on by a rotary cam driven to rotate by advancement of the film.

The rotary cam may comprise an angular cutout region defining at one edge thereof an abutment surface, and a circumferential cam surface extending between those opposite edges defining the cutout from a surface close to the cam axis to a surface more distant therefrom which connects to said abutment surface, said other end of the shutter release lever abutting the abutment surface in the primed position, and as the film is advanced subsequent to shutter release riding up the cam surface to rotate the shutter release lever back towards the primed position, the shutter release lever disengaging from the cam when the cutout is reached and being urged vertically against the abutment surface under the action of its return spring.

A third electrical contact may be provided spaced from and overlying the second spring contact and connected to the opposite side of the motor whereby electrical connection between the second and third contacts provides an electrical short across the motor, the shutter release lever forcing the second contact against the third as the shutter release lever moves up to the primed position.

A film sensing switch may be connected in series with the motor which serves to disable the motor in the absence of a loaded film.

In a further aspect the invention resides in a camera comprising a main body defining a pair of film chambers on opposite sides of an exposure opening comprising a first chamber for receiving a film cassette having a central spool to which film is secured and a second chamber for containing film pre-wound therein prior to use, a drive shaft having an end which extends into the first chamber for engaging the spool, and an electric motor disposed between the first and second chambers and operably connected to the drive shaft to drive the shaft in one direction.

The electric motor may be connected to the drive shaft through a gear train.

In a further aspect the invention resides in a camera comprising a main body defining a pair of film chambers on opposite sides of an exposure opening comprising a first chamber for receiving a film cassette having a central spool to which film is secured and a second chamber for containing film pre-wound therein prior to use, and a rear cover removable from the main body to expose the film chambers, a rotably mounted film counter operably connected to drive means which, in use, engage the film whereby the film counter is rotably driven on film advancement, the film counter comprising a circular member with peripheral teeth and including a spring to urge the counter towards a re-set position, the film advancement rotating the film counter against the action of the spring, and wherein ratchet means engage the film counter is ensure its rotation in one direction only on film advancement.

The ratchet means may comprise a resilient member extending from the rear cover and urged against the counter wheel, whereby on opening of the rear cover the ratchet means is disengaged allowing counter wheel to rotate under the action of its spring to its re-set position.

BRIEF DESCRIPTION OF THE DRAWINGS

An embodiment of the invention will now be described, by way of example only with reference to the following drawings in which:

FIG. 15 shows the movement of the cam and shutter release lever during film winding;

FIG. 16 shows the movement of the cam and shutter release lever moving back to the default position.

DETAILED DESCRIPTION OF THE PREFERRED EMBODIMENT

Figure 1:
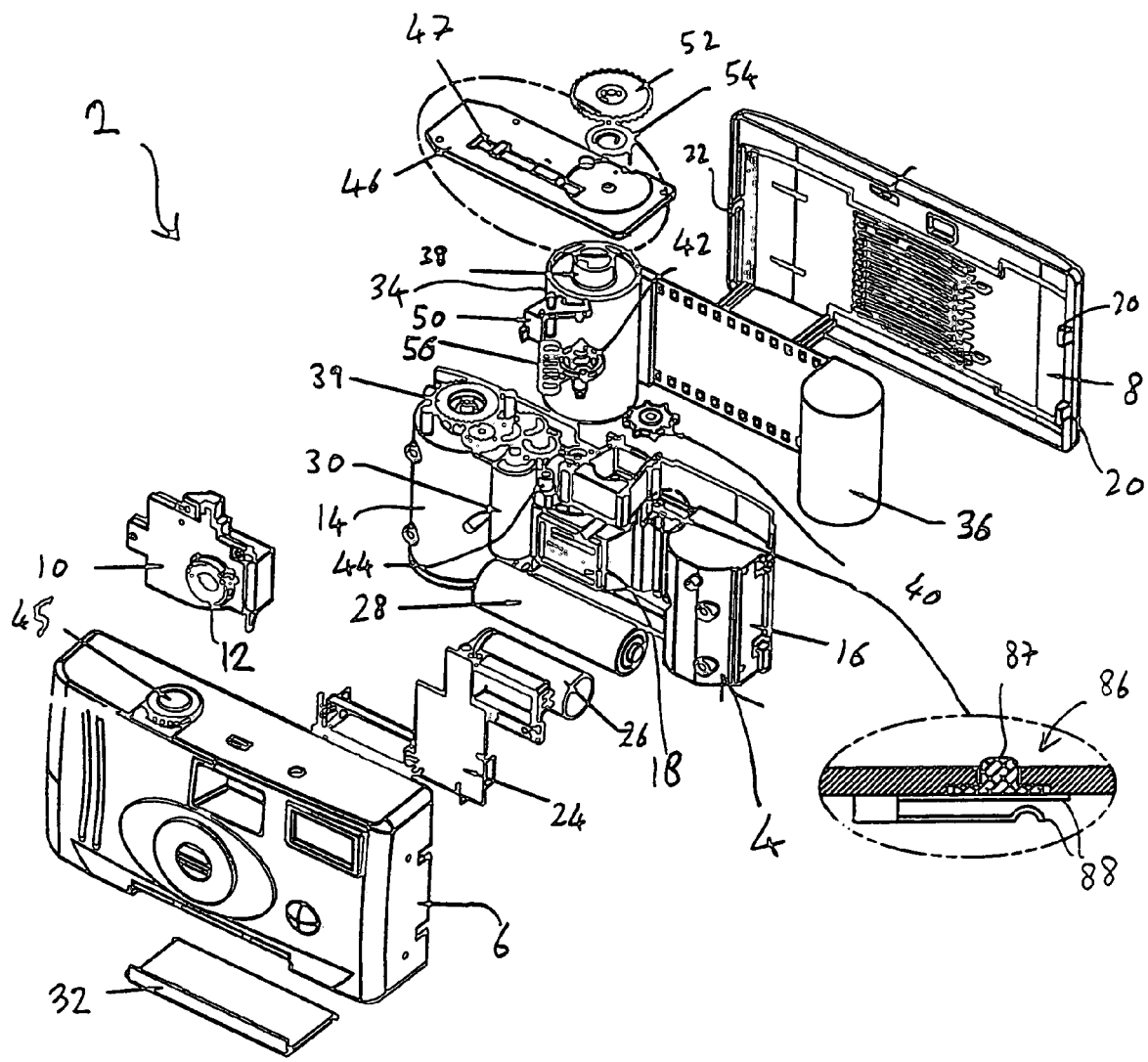
FIG. 1 is a perspective part-exploded view of the camera in accordance with an embodiment of the invention.

As seen in FIG. 1, the camera, indicated generally by numeral 2, includes a main body part 4 which carries the majority of the operative components of the camera 2, and a front cover part 6 and rear or back cover part 8 which together enclose the main body 4. The main body 4 supports a shutter mechanism 10 provided with a lens assembly 12, a front portion of which extends through an aperture in the front cover part 6. The main body 4 defines part of a first film-cassette receiving chamber 14 which receives a film-containing cassette or patrone of a film package or assembly described further below. A second film receiving chamber 16 is arranged at the opposite side of the camera. Between the film chambers 14 and 16 is arranged an exposure window 18 located between upper and lower film guides which support the film at its edges as it extends between the film chambers. A film passageway for the film to travel between the film chambers 14 and 16 is defined between the back cover 8 and opposed region of the main body 4 and film guides.

The back cover 8 is hingedly secured to the front cover 6 through lugs 20 secured in slots or openings in the front cover 6 and a releasable latch 22 is provided at the opposite side of the cover 8 to allow opening and closing of the back cover 8 by the user and/or re-loader. Also visible in FIG. 1 is a printed circuit board 24 supporting various components largely associated with the flash including capacitor 26. A battery or batteries 28 provides power for the flash and also for a film wind-on or advancement motor 30, discussed in further detail below. The motor is disposed to lie between the chambers 14, 16 with motor axis vertical, specifically between chamber 14 and the exposure window 18. The battery 28 is accessible at the base the camera 2 via a removable battery door 32.

Figure 2:
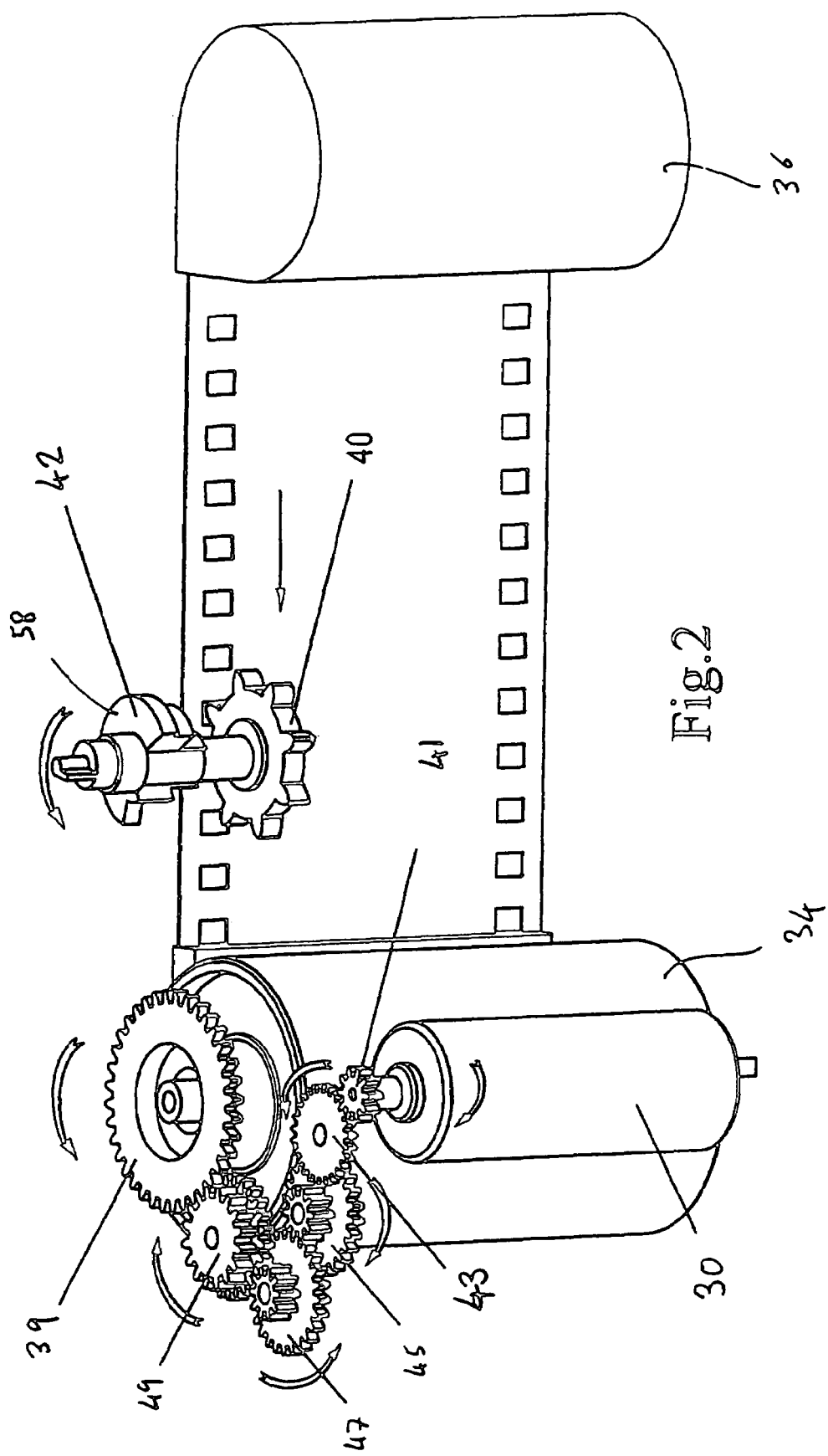
FIG. 2 shows a film assembly, motor and drive gear train.

As best seen in FIG. 2, the film is provided in the form of a film assembly comprising a first film cassette 34 which is a conventional 35 mm cassette or patrone, and a second film container 36 preferably of a smaller dimension than a conventional cassette, into which the majority of the film is pre-wound either at the factory or before the assembly is supplied to the user in the case of a film to be re-loaded. Although not visible the film container 36 preferably comprises a housing which is formed as two housing shell halves and which co-operate to form an enclosure defining an elongate film slot between opposed edges. The patrone 34 has, as is conventional, a metal housing and a central spool 38, the film being wound about the spool 38 in a roll with a leading end secured to the spool 38 in a conventional manner. A drive gear 39 is connected to a drive shaft having a lower end with a fork-like protrusion (not visible) which extends into the patrone-receiving chamber 14 so as to engage the spool 38 of the cassette 34, with a gear train being provided between the motor 30 and the drive gear 39. As shown in FIG. 2 there is provided a first gear 41 secured to the motor shaft, a second gear 143 meshed therewith, a third gear pair 145, fourth gear pair 147 and fifth gear pair 149 meshed to provide appropriate speed reduction. It will be appreciated that various other gear trains or drive arrangements including pulleys or belts could likewise be used.

A sprocket gear 40 is provided comprising eight sprocket teeth, the gear being precisely dimensioned so the circumference is the dimension of one film frame so that the teeth fit into the sprocket holes of a 35 mm film and so that advance of the film by a single film frame causes precisely a single rotation of the gear 40. The sprocket gear 40 preferably comprises two separate parts as is described in applicant's U.S. Pat. Ser. No. 09/792,392, namely a main gear part having seven spaced teeth and which defines an annular or a part-annular recess, and a slot at the position of the eighth tooth, and a separate alignment tooth part formed on a part-annular portion which constitutes an insert fitting into the recess. This allows the alignment tooth to be moulded out of a different coloured plastics material; for example, the majority of the camera components are usually of black moulded plastics; the alignment tooth may be of a contrasting colour such as white. The purpose of this is to ensure correct position of the sprocket and associated components or film loading. In an alternative modification, instead of forming the alignment tooth as a separate part, the sprocket wheel can instead have all eight teeth formed unitarily, and the alignment tooth can be painted a separate colour or coated in some other way to give a contrasting colour to the other seven teeth. In a still further alternative the alignment tooth is distinguished by some other indicating means such as use of a marking, indicia or symbol or letters or similar. In a still further alternative the alignment tooth may have a different shape to distinguish it from the other seven teeth. The sprocket gear 40 is supported on a rotary cam 42 best seen in FIG. 2, and itself constrained to rotate about its longitudinal axis and supported between a locating well 44 on the main body and a plate 46.

Figure 4:
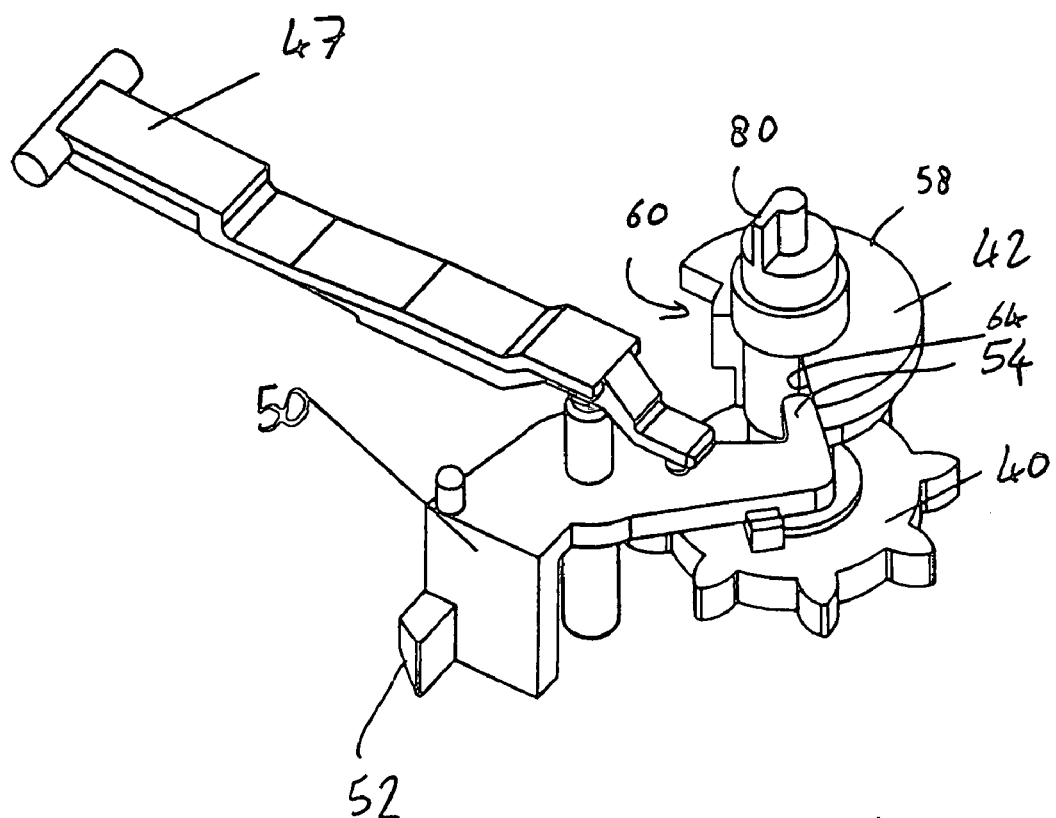
FIG. 4 shows part of the shutter release assembly in the default position.
Figure 5:
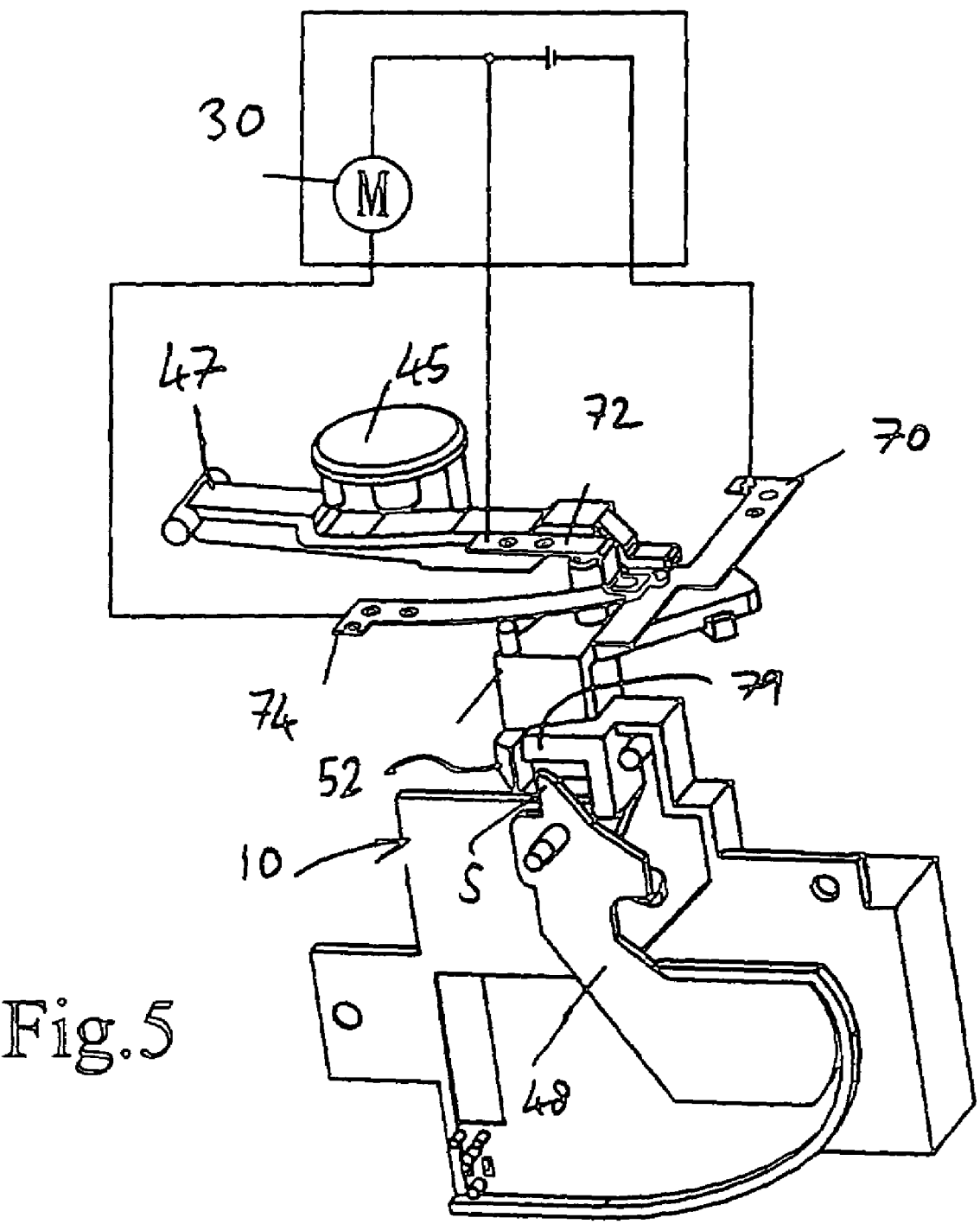
FIG. 5 shows the shutter mechanism, shutter release assembly and motor control switch in the default position.

The shutter mechanism 10 contains a spring-loaded shutter plate or blade 48 best seen in FIG. 5 which shows the mechanism with a front plate removed which has an exposed end S. A shutter release assembly, as shown for example in FIGS. 3 and 4 acts on the shutter blade, and includes a shutter release lever 50 for momentarily flicking the exposed end S of the shutter plate and thus opening an exposure aperture behind the lens to permit photographic exposure on the film through the lens 12 and exposure window 18. A shutter release button 45 is provided on the top of the front cover 6 so as to be depressible against the force of an upwardly biased spring (not visible) which lies beneath the button 45 and is supported on the plate 46. A shutter lock may be provided to prevent inadvertent depression of the shutter button 45. Beneath the button 45 is an actuator lever 47 supported to pivot about one end. The free end of the lever 47 is able to act against the shutter release lever 50 as discussed further below. The plate 46 also supports a film frame counter 52 for rotation thereon, and a re-set coil spring 54, the operation of which is also discussed further below.

The shutter release lever 50 extends generally horizontally and is pivotably mounted to rotate about a vertical axis and is acted on by an assembly of the sprocket wheel 40 and the cam 42 the latter two being axially interengaged for simultaneous rotation. One end of the shutter release lever 50 has a first radially-extending projection 52 for engaging the shutter blade end S and a second tangentially extending (relative to the pivot) finger 54 for engaging the cam 42. The lever 50 is spring-loaded by spring 56 (omitted from FIGS. 3 to 14 for reasons of clarity) which urges it to turn in the anti-clockwise sense (viewed from above) and on release to thereby cause the second projection 52 to strike the shutter plate end S on taking a photograph. The spring 56 also urges the lever 50 upwardly.

As noted, the sprocket 40 is keyed to the cam 42 so that upon movement of the film by the motor 30, the film rotates the sprocket 40 and in turn the cam 42 above it in the same direction. The cam 42 has an upper circular disc portion 58 having a side cutout 60 and below the disc portion a lower cam portion 62 radially expanding as one travels around the periphery (indicated in dotted lines in FIGS. 15 and 16). The edge region defining the trailing edge of the cutout 60 constitutes an abutment surface 64.

Figure 3:
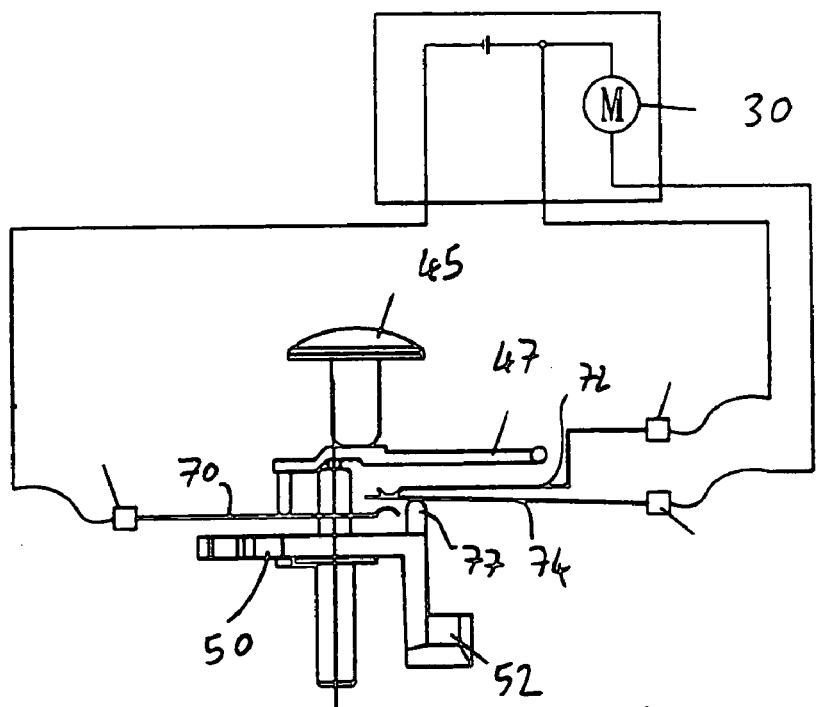
FIG. 3 is a part-schematic view of a shutter release assembly and motor control switch in a default primed position.

The electrical circuit for activating and interrupting the operation of the motor 30 is illustrated schematically for example in FIG. 3, whilst FIG. 5 shows the physical construction of electrical contacts. More particularly, the motor 30 is connected to a switch assembly comprising three movable contacts 70, 72 and 74. Activation, at the appropriate time, of the motorised wind-on of film, and shutter release and re-cocking is achieved in the manner as illustrated in FIGS. 3 to 14. FIG. 3 shows the default or primed position. As can be seen in FIG. 3, the shutter release button 45 is in its normal up position, where it is urged by its underlying spring. In this position the first contact 70 is spaced from the second contact 74 and a third contact 72 whereby the motor circuit is not completed. Contacts 72 and 74 however are touching. Second contact 74 is disposed so that in the primed position it is being upwardly deformed by a protrusion 77 extending upwardly from the lever 50. Turning to FIG. 4 the finger 54 of the lever 50 abuts the abutment surface 64 of the cutout of the cam 42. The shutter release lever 50 is in its upmost position. The projection 52 laterally abuts a stop surface 79 on the shutter mechanism which overlies a slot at the position of the blade end S, and through this stop 79 is prevented from rotating in the clockwise direction under the action of spring 56.

Figure 6:
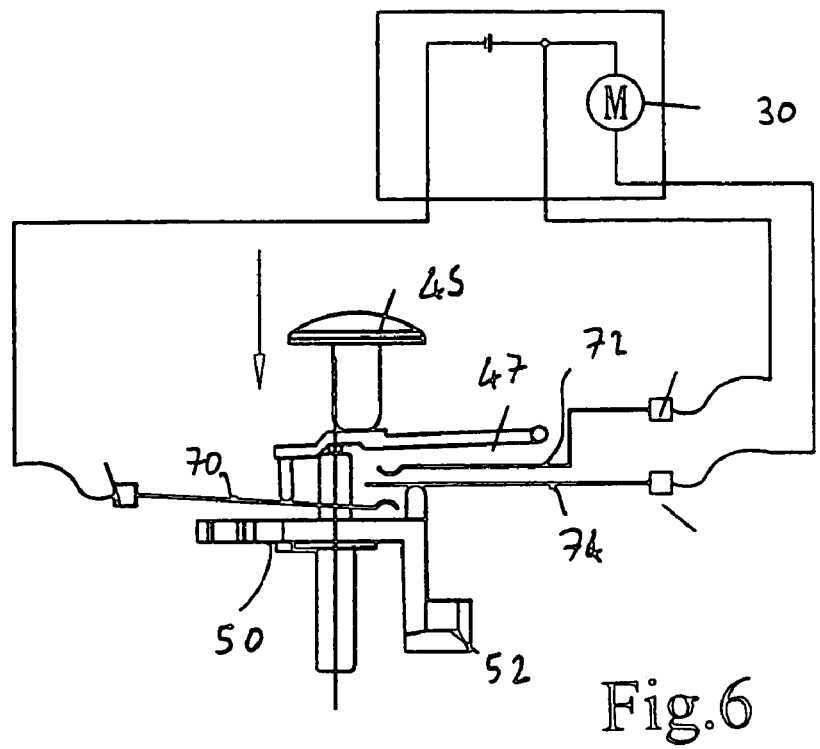
FIG. 6 is a part-schematic view of the shutter release assembly and motor control switch during photograph taking.
Figure 7:
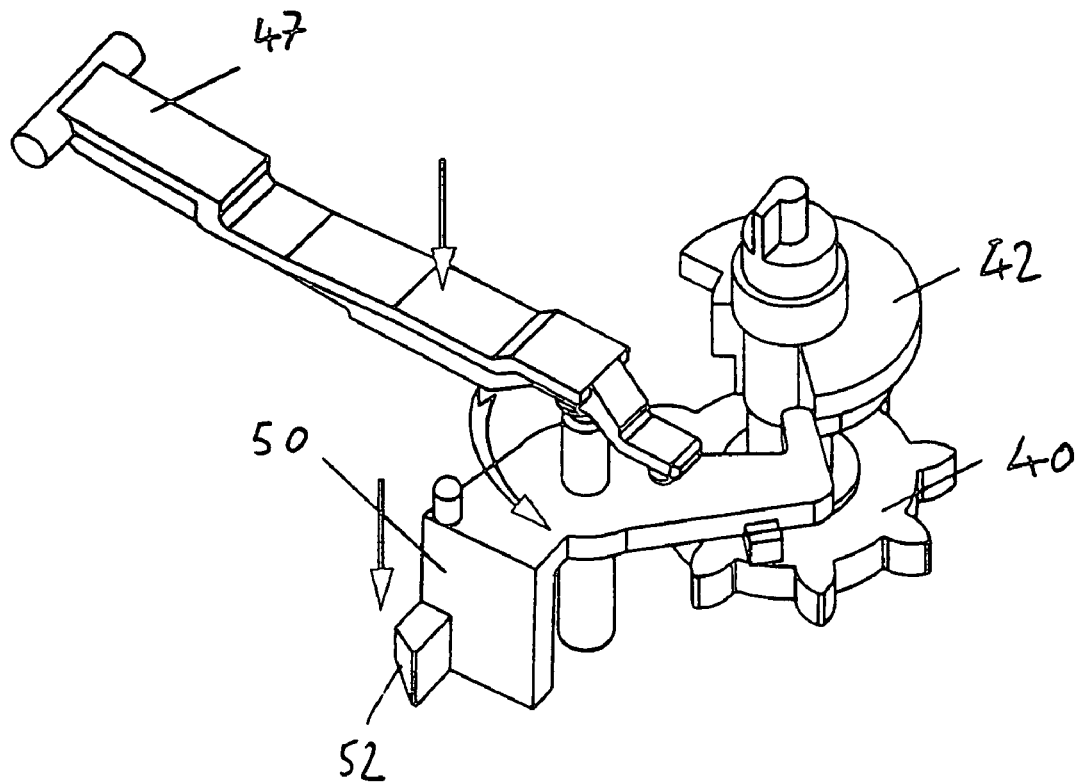
FIG. 7 shows part of the shutter release assembly during photograph taking.
Figure 8:
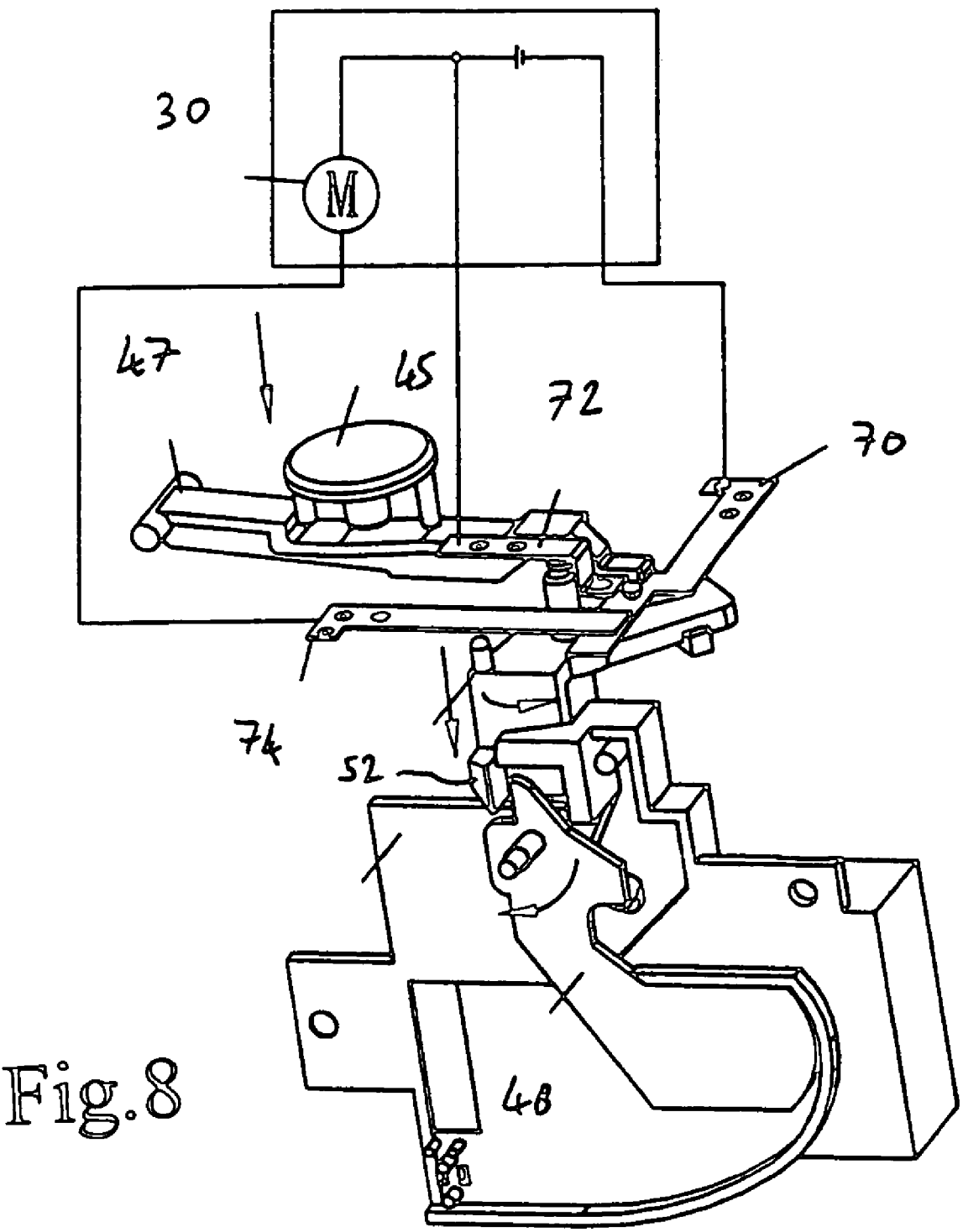
FIG. 8 shows part of the shutter mechanism, shutter release assembly, and motor control switch during photograph taking.

As the shutter button 45 is depressed on taking a picture as shown in FIGS. 6, 7 and 8, the actuator lever 47 moves down against the lever 50 against the force of the spring 56. The contact 70 is also urged downwardly as can be seen in FIG. 3 by a projection depending from the underside of the lever, whilst contact 74 also moves down under its own resilience, disconnecting from contact 72. As the projection 52 clears the lower edge of the stop 79 on the shutter mechanism 10 the lever 50 is then able to rotate a small distance about its vertical axis in a counterclockwise direction (when viewed from above) under the rotational force of the spring 56, the projection 52 sweeping over the end S of the shutter blade. The shutter blade pivots momentarily in a clockwise sense (when viewed from the front, and as in FIG. 4(*c*)) opening the shutter briefly before it is closed by the return force of its associated spring, and thereby exposing the film opposite the exposure opening.

Figure 9:
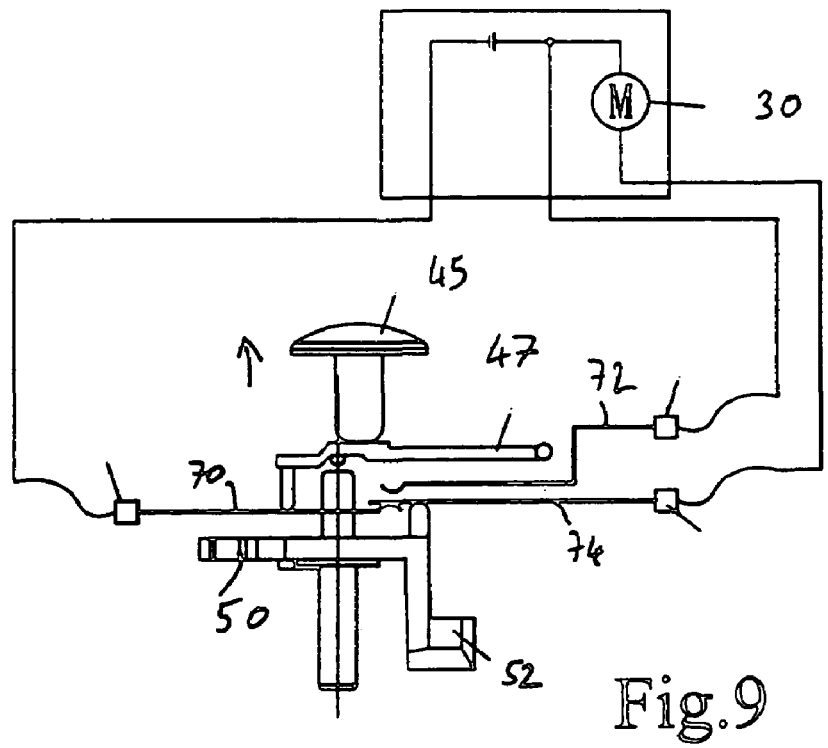
FIG. 9 is a part-schematic view of the shutter release assembly and motor control switch during film winding.
Figure 10:
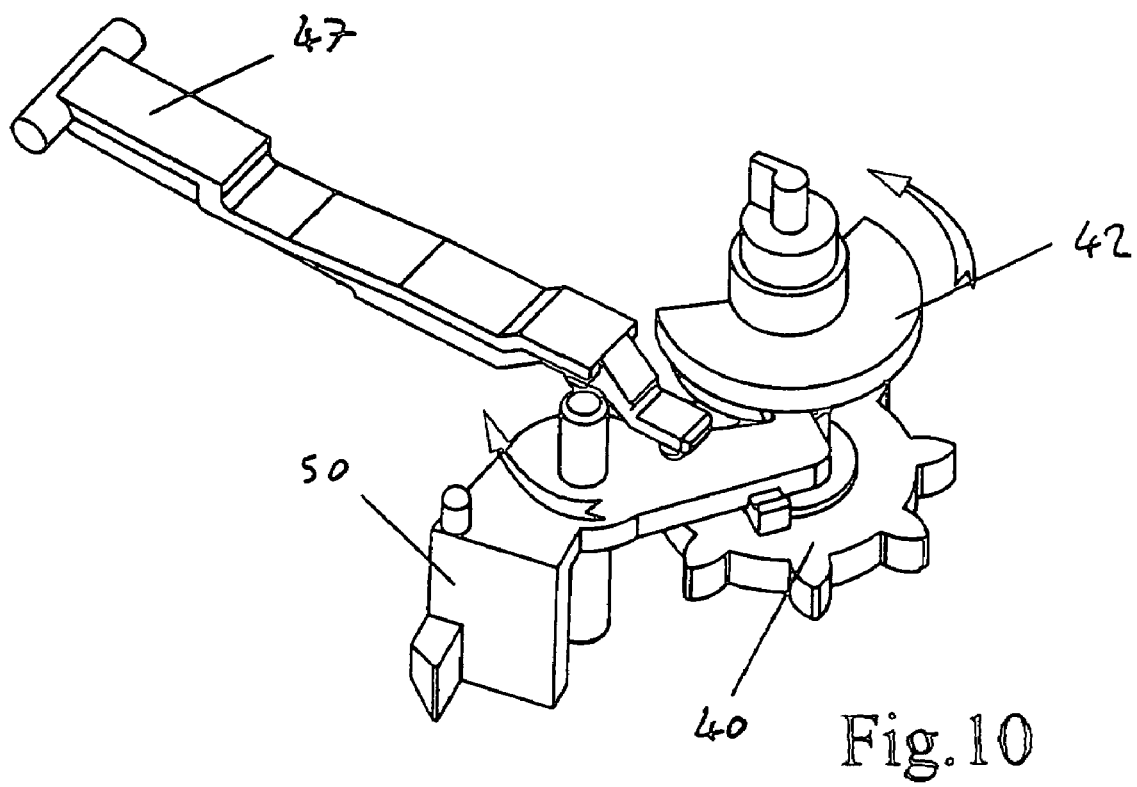
FIG. 10 shows part of the shutter release assembly during film winding.
Figure 11:
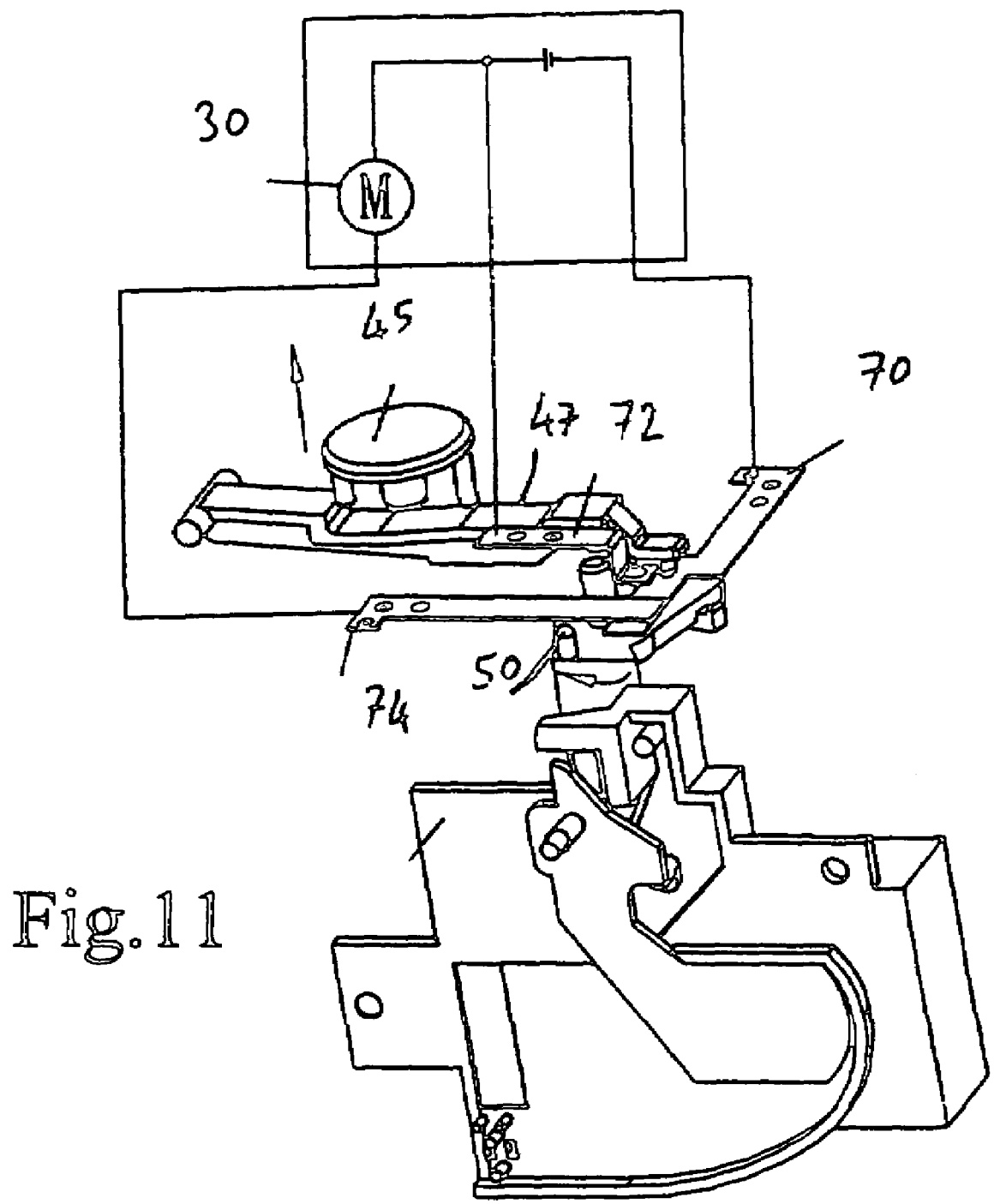
FIG. 11 shows the shutter mechanism, shutter release assembly, and motor control switch during film winding.
Figure 12:
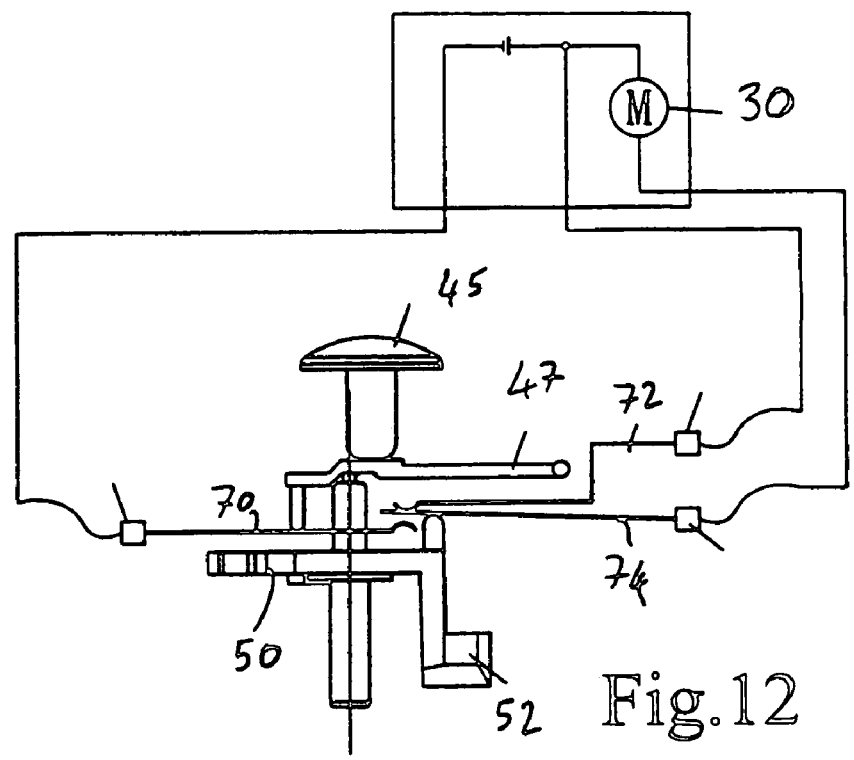
FIG. 12 is a part-schematic view of the shutter release assembly and motor control switch after winding returning to the default position.
Figure 13:
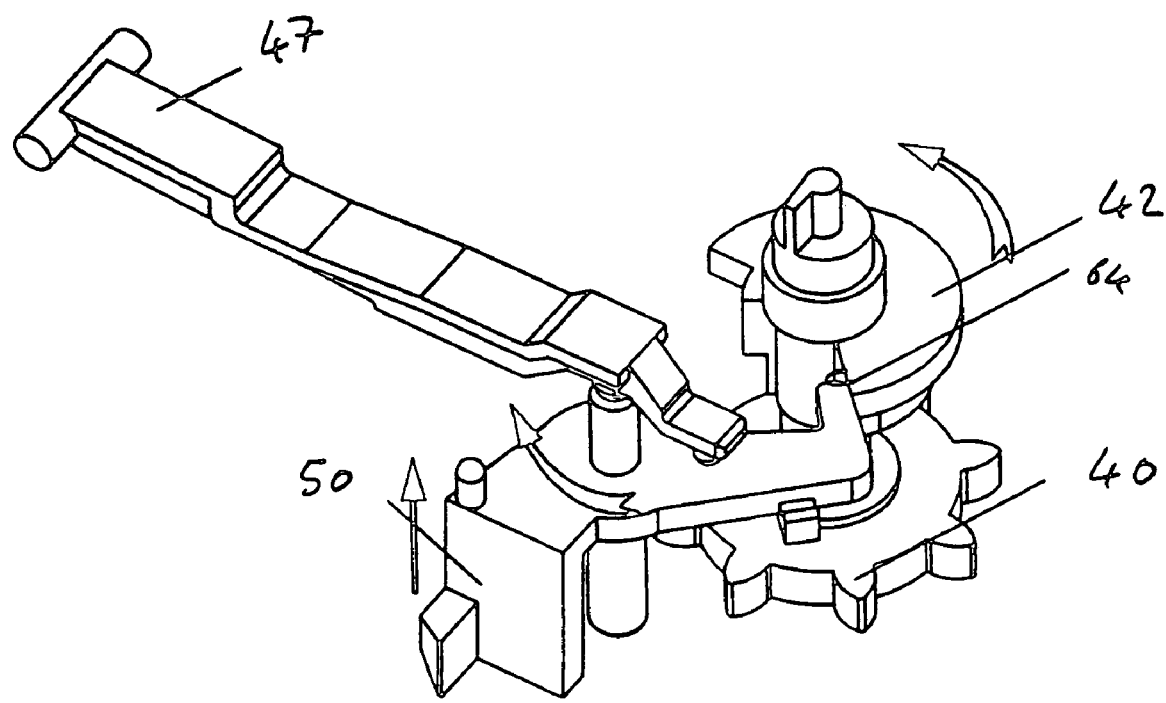
FIG. 13 shows part of the shutter release assembly after winding returning to the default position.
Figure 14:
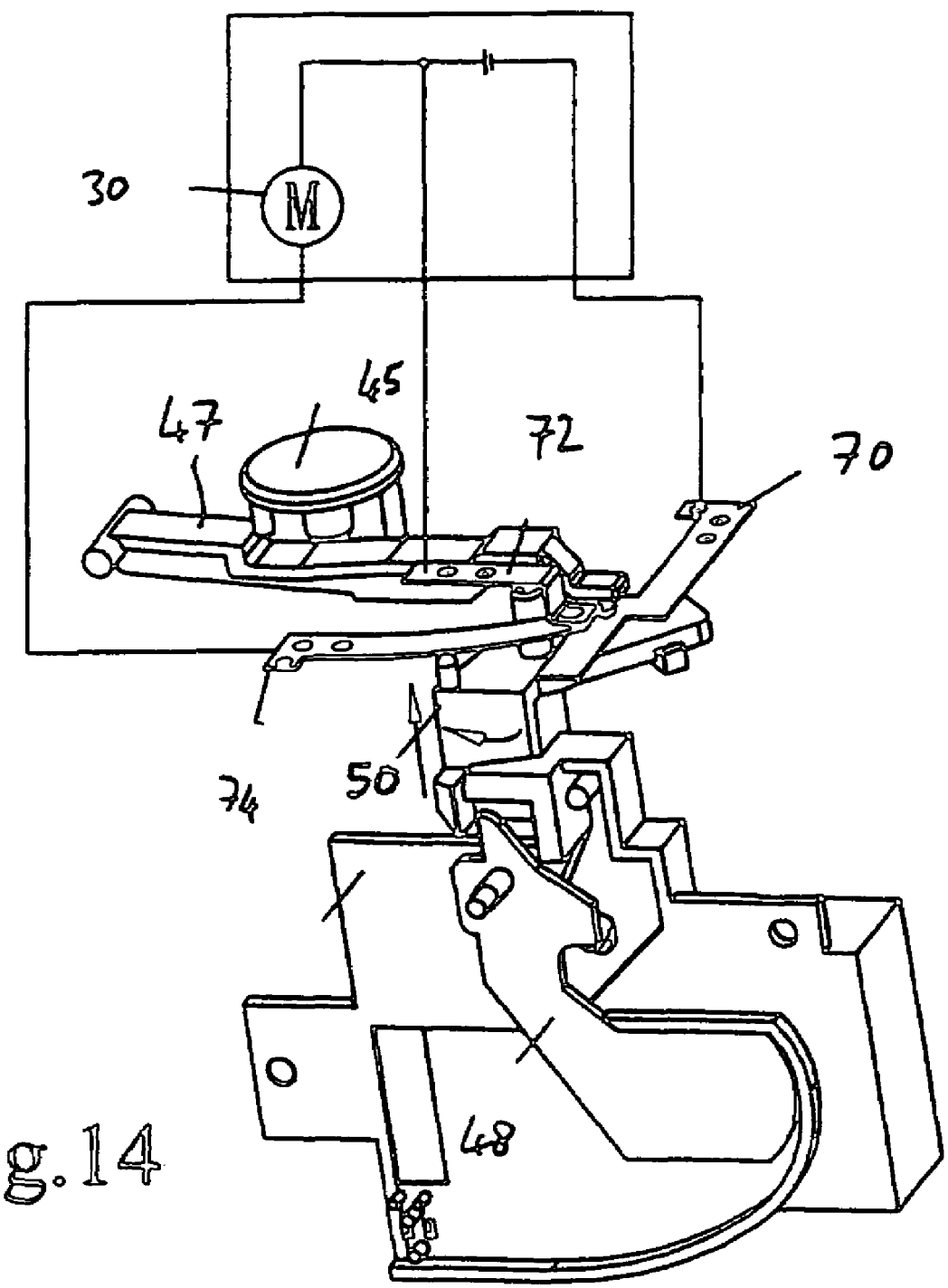
FIG. 14 shows the shutter mechanism, shutter release assembly and motor control switch after winding returning to the default position.

As indicated in FIG. 9, when the shutter button 45 is released by the user the contact 70 moves upwardly urging the lever 47 upwardly with it. Contacts 70 and 74 become connected completing the motor circuit which thereby activates the motor, rotating the drive wheel 39 via the gear train and advancing the film and winding it back into the cassette 34. As the film advances the sprocket wheel 40 is rotated by means of the film perforations engaged therewith, rotating the cam 42 in an anticlockwise sense as indicated in FIG. 10. FIG. 15 illustrates the movement of the cam 42 and lever 50. FIG. 15(*a*) shows the cam position on start of the motor. As shown in FIG. 15(*b*) the cam 42 rotates clockwise, with the finger 54 riding up onto the cam surface 62 beneath the disc-like top portion 58. As this continues the finger 54 is being urged away from the cam axis thereby rotating the lever in a clockwise sense. As this continues the finger slides off the end of the cam surface 62 and onto the abutment surface 64 (FIGS. 16(*a*) and (*b*)), at which time the upward force of the spring 56 urges the lever 50 upwardly again, with finger 54 extending into the cutout of the cam 42 (FIG. 16(*b*)). This represents the re-primed position identical to that of FIGS. 3, 4 and 5. This upward movement of the lever 50 causes the connection between contacts 70 and 74 to be broken stopping the motor. In addition, a connection between contacts 72 and 74 is made thereby short-circuiting the motor connection, having the effect of instantaneously dissipating any residual currents remaining within the motor for example due to the motor inductance.

Thus, the depression of the shutter button 45 by the user takes a photograph, whilst subsequent release initiates the film advancement by one frame which in turn re-cocks or re-primes the shutter ready for the next exposure.

Figure 17:
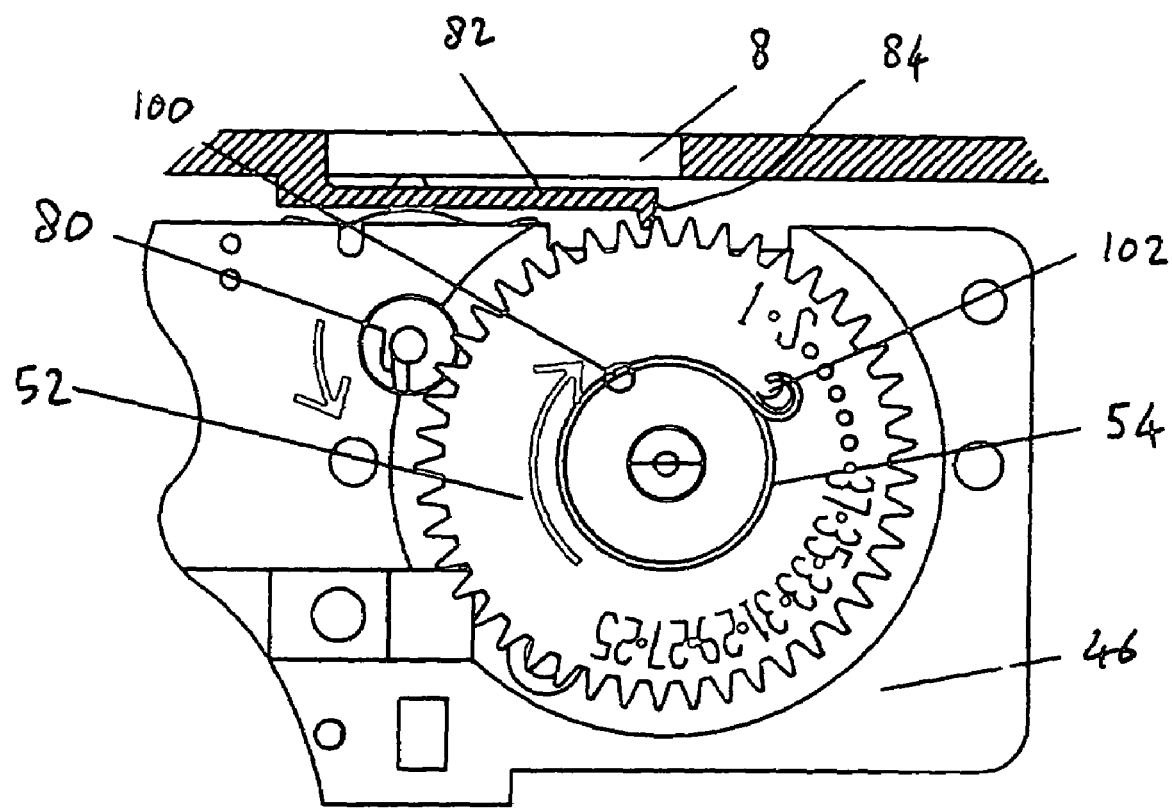
FIG. 17 is a view of a film frame counter.

The rotation of the cam 42 also effects movement of the film counter wheel 52. As can be seen in for example FIG. 4 and further enlarged in FIG. 17, the top of the cam 42 includes a lateral projection 80. As the cam 42 makes a complete revolution, as occurs each time the film advancement sequence described above is carried out the cam projection 80 rotates, and engages the adjacent peripheral tooth of the counter wheel 52 driving it by an angular displacement which corresponds to one tooth. The counter wheel 52 is provided with an automatic re-set facility. Underneath the counter wheel there is provided a coil spring 54 (shown in FIG. 17 although in reality it is disposed under the wheel) one end 100 of which is fixed to the plate 46, the other end 102 of which is secured to the underside of the counter wheel by means of a projection depending therefrom. A ratchet mechanism is provided in the form of springy leg 82 extending from the camera back door 8, generally parallel thereto having at its end a finger 84 which engages within the teeth of the counter wheel 52 shaped to engage within the teeth to prevent rotation of the counter wheel in the anticlockwise direction only. As the counter wheel 52 rotates on film advancement, the spring 54 becomes increasingly tensioned. However, when the back door 8 is opened, the ratchet disengages from the counter wheel 52, and the spring 54 returns the counter wheel to the re-set "zero" or start position.

The camera may also be provided with a film sensor to ensure that the motor operates only when there is film in the camera. As shown in the inset of FIG. 1 the sensor 86 comprises a projection 87 mounted on one of a pair of metallic spring contacts 88 protruding through an opening in the main body facing the film guide. The contacts 88 constitute a switch located in series with the motor 30. When film is loaded the projection is urged such that the contacts 88 touch each other.

The invention claimed is:

1. A camera comprising:
a main body defining a pair of film chambers on opposite sides of an exposure opening comprising a first chamber for receiving a film cassette having a central spool to which film is secured and a second chamber for receiving a second film container into which film is pre-wound prior to use,
a drive shaft having an end which extends into the first chamber for engaging the spool,
a shutter mechanism including a movable shutter blade,
a shutter release assembly having a user-accessible shutter button and shutter release lever having a primed position from which depression of the shutter button acts to cause shutter release lever to strike the shutter blade and moving to a discharged position, the shutter button being depressible against the action of resilient means,
a motorized film advance assembly comprising a motor operatively connected to the drive shaft to drive the drive shaft in one direction and activated on closing of a contact pair,
wherein the contact pair comprises a first spring contact acted on by said shutter button and a second spring contact bent away from the first spring contact and maintained spaced therefrom by the shutter release lever in the primed position, the first spring contact being bendable away from the second spring contact through depression of the shutter button and returning through its resilience, the shutter button also acting to displace the shutter release lever to the discharged position whereby the second spring contact moves towards the first, spring contact, the spring contacts touching after depression and subsequent release of the shutter button, activating the film advance motor.

2. A camera according to claim 1 wherein the switch means and shutter release assembly is arranged to de-activate the motor on movement of the shutter release assembly from the discharged condition back to the primed position.

3. A camera according to claim 1 wherein the second spring contact vertically overlies the first spring contact, and wherein the shutter button is vertically displaceable to act against the first spring contact.

4. A camera according to claim 3 further comprising an actuating lever disposed between the shutter button and the first spring contact and the shutter release lever whereby depression of the shutter button causes depression of the first spring contact, and of the shutter release lever.

5. A camera according to claim 4 wherein the shutter release lever is mounted for vertical displacement on depression of the shutter button, and for rotation about a vertical axis with one end of the lever adapted to strike the shutter blade on rotation, and the other end of which is acted on by a rotary cam driven to rotate by advancement of the film.

6. A camera according to claim 5 wherein the rotary cam comprises an angular cutout region defining at one edge thereof an abutment surface, and a circumferential cam surface extending between those opposite edges defining the cutout from a surface close to the cam axis to a surface more distant therefrom which connects to said abutment surface, said other end of the shutter release lever abutting the abutment surface in the primed position, and as the film is advanced subsequent to shutter release riding up the cam surface to rotate the shutter release lever back towards the primed position, the shutter release lever disengaging from the cam when the cutout is reached and being urged vertically against the abutment surface under the action of its return spring.

7. A camera according to claim 1 wherein a third electrical contact is provided spaced from and overlying the second spring contact and connected to the opposite side of the motor whereby electrical connection between the second and third contacts provides an electrical short across the motor, the shutter release lever forcing the second contact against the third as the shutter release lever moves up to the primed position.

8. A camera according to claim 1 in combination with a film assembly comprising a standard film cassette having a central spool to which film is secured and a second film container within which the majority of the film is wound.

9. A camera according to claim 1 wherein the electric motor is connected to the drive shaft through a gear train.

10. A camera comprising a main body defining a pair of film chambers on opposite sides of an exposure opening comprising a first chamber for receiving a film cassette having a central spool to which film is secured and a second chamber for containing film pre-wound therein prior to use, and a rear cover removable from the main body to expose the film chambers, and rotatably mounted film counter operably connected to drive means which, in use, engage the film whereby the film counter is rotatably driven on film advancement, the film counter comprising a circular member with peripheral teeth and including a spring to urge the film counter towards a re-set position, the film advancement rotating the film counter against the action of the spring, and wherein ratchet means engage the film counter to ensure its rotation in one direction only on film advancement, the ratchet means comprising a resilient member extending from the rear cover and urged against the counter wheel, whereby on opening of the rear cover the ratchet means is disengaged allowing a counter wheel to rotate under the action of its spring to its re-set position.

11. A camera comprising:
a main body defining a pair of film chambers on opposite sides of an exposure opening comprising a first chamber for receiving a film cassette having a central spool to which film is secured and a second chamber for receiving a second film container into which film is pre-wound prior to use,
a drive shaft having an end which extends into the first chamber for engaging the spool,
an electric motor operably connected to the drive shaft to drive the drive shaft in one direction,
a shutter mechanism including a movable shutter blade,
a shutter release assembly having a user-accessible shutter button which acts on a shutter release lever which in turn acts on the shutter blade, and having a primed position wherein depression of the shutter button activates the shutter and a discharged position,
motor control switch means comprising first and second spring contacts, the second contact overlying the first spring contact and being spaced therefrom in the primed position, the shutter release lever being arranged to be depressible through the action of the shutter button against the action of a return spring, and to return to an upward position on return to the primed position, the shutter button also acting on the first spring contact to depress this on depression of the shutter button, and the second spring contact being downwardly biased and abutting the shutter release lever in the primed position, whereby electrical contact is made after depression and subsequent release of the shutter button.

12. A camera according to claim 1 further comprising a film sensing switch connected in series with the motor which serves to disable the motor in the absence of a loaded film.

13. A camera according to claim 1 wherein the shutter release lever is driven from the discharged position to the primed position on motor activation.

14. A camera comprising:
a main body defining a pair of film chambers on opposite sides of an exposure opening comprising a first chamber for receiving a film cassette having a central spool to which film is secured and a second chamber for receiving a second film container into which film is pre-wound prior to use;
a drive shaft having an end which extends into the first chamber for engaging the spool;
a shutter mechanism with a movable shutter blade;
a shutter release assembly having a user accessible shutter button and shutter release lever, the shutter release lever being mounted for both pivoting movement wherein an end of the lever strikes the shutter blade, and displacement in a direction generally parallel to the axis of pivoting on movement from a primed to discharged position, the shutter button being depressible against the action of resilient means;
a motorized film advance assembly comprising a motor operatively connected to the drive shaft to drive the drive shaft in one direction and activated on closing of a contact pair;
wherein the contact pair comprises a first spring contact acted on by said shutter button and a second spring contact which overlies the first spring contact bent away from the first spring contact and maintained spaced therefrom by the shutter release lever in the primed position, the first spring contact being bendable away from the second spring contact through depression of the shutter button, the shutter button also acting to displace the shutter release lever to the discharged position whereby the second spring contact moves towards the first, spring contact, the spring contacts touching after depression and subsequent release of the shutter button, activating the film advance motor.

* * * * *